United States Patent
Venkitachalam et al.

(10) Patent No.: US 7,844,954 B2
(45) Date of Patent: Nov. 30, 2010

(54) USING BRANCH INSTRUCTION COUNTS TO FACILITATE REPLAY OF VIRTUAL MACHINE INSTRUCTION EXECUTION

(75) Inventors: Ganesh Venkitachalam, Mountain View, CA (US); Michael Nelson, Alamo, CA (US); Boris Weissman, Mountain View, CA (US); Min Xu, Palo Alto, CA (US); Vyacheslav V. Malyugin, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 94 days.

(21) Appl. No.: 12/057,282

(22) Filed: Mar. 27, 2008

(65) Prior Publication Data

US 2009/0119493 A1    May 7, 2009

Related U.S. Application Data

(60) Provisional application No. 60/985,929, filed on Nov. 6, 2007.

(51) Int. Cl.
*G06F 9/44*    (2006.01)
(52) U.S. Cl. .......................... 717/130; 717/132; 717/135
(58) Field of Classification Search ........................ None
See application file for complete search history.

(56) References Cited

U.S. PATENT DOCUMENTS

| | | | | |
|---|---|---|---|---|
| 5,774,724 A | * | 6/1998 | Heisch | 717/129 |
| 6,971,091 B1 | | 11/2005 | Arnold et al. | |
| 2004/0024995 A1 | * | 2/2004 | Swaine | 712/227 |
| 2004/0268348 A1 | | 12/2004 | Waki et al. | |
| 2006/0021054 A1 | * | 1/2006 | Costa et al. | 726/25 |
| 2006/0167916 A1 | * | 7/2006 | Vertes | 707/101 |
| 2006/0259818 A1 | | 11/2006 | Howell et al. | |
| 2008/0320594 A1 | * | 12/2008 | Jiang | 726/24 |

OTHER PUBLICATIONS

Bhansali et al. "Framework for Instruction-level Tracing and Analysis of Program Executions", 2006, Proceedings of the 2nd international conference on Virtual execution environments, pp. 154-163.*
Dunlap et al. "ReVirt: Enabling Intrusion Analysis through VIrtual-Machine Logging and Replay", 2002, In Proceedings of the 2002 Symposium on Operating Systems Design and Implementation.*
Xu et al. "ReTrace: Collecting Execution Trace with Virtual Machine Deterministic Replay", 2007, In Proceedings of the 3rd Annual Workshop on Modeling, Benchmarking and Simulation.*
Bressoud et al. "Hypervisor-based fault tolerance", 1995, Proceedings of the fifteenth ACM symposium on Operating systems principles.*
Notification of Transmittal of the International Search Report and the Written Opinion of the International Searching Authority, or the Declaration, Dec. 19, 2008, PCT/US08/82401.

* cited by examiner

*Primary Examiner*—Jason D Mitchell

(57) ABSTRACT

A method and computer program product for logging non-deterministic events of a virtual machine executing a sequence guest instructions, the method including tracking an execution point in the sequence of executing guest instructions, the tracking of the execution point including determining a branch count of executed branch instructions; and detecting an occurrence of a non-deterministic event directed to the virtual machine during execution of the sequence of guest instructions, and recording information which includes an identifier of a current execution point, wherein the identifier includes the branch count.

10 Claims, 15 Drawing Sheets

US 7,844,954 B2

USING BRANCH INSTRUCTION COUNTS TO FACILITATE REPLAY OF VIRTUAL MACHINE INSTRUCTION EXECUTION

This application claims the benefit of U.S. Provisional Application No. 60/985,929, filed Nov. 6, 2007, which provisional application is incorporated herein by reference in its entirety.

BACKGROUND

A virtual machine environment provides a convenient platform for efficient logging and replaying execution. Logging and replaying execution of a virtual machine has several applications such as, for example, debugging, fault tolerance, and trace driven simulations. For example, logging and replaying allows a computer architect to perform detailed analysis of run-time information in an offline environment using trace simulations. Logging and replay can also be used to improve fault tolerance by enabling a virtual machine to recover from a system error by replaying execution from the last known save point. With regard to debugging, logging and replaying allows an analyst to identify what causes a software bug to occur by recording the computer operation when the error is reproduced, and then stepping through the execution while reviewing the system state at each step to identify the cause.

A conventional execution logging and replay system typically uses specialized hardware that monitors and logs every instruction executed by the processor. However, these conventional trace collection techniques are often slow due to software tracing overhead. Furthermore, special tracing hardware can be expensive.

SUMMARY

A method and computer program product for logging non-deterministic events of a virtual machine executing a sequence guest instructions, the method including tracking an execution point in the sequence of executing guest instructions, the tracking of the execution point comprising determining a branch count of executed branch instructions; and detecting an occurrence of a non-deterministic event directed to the virtual machine during execution of the sequence of guest instructions, and recording information which comprises an identifier of a current execution point, wherein the identifier includes the branch count.

DETAILED DESCRIPTION OF EMBODIMENTS

Figure 2A:
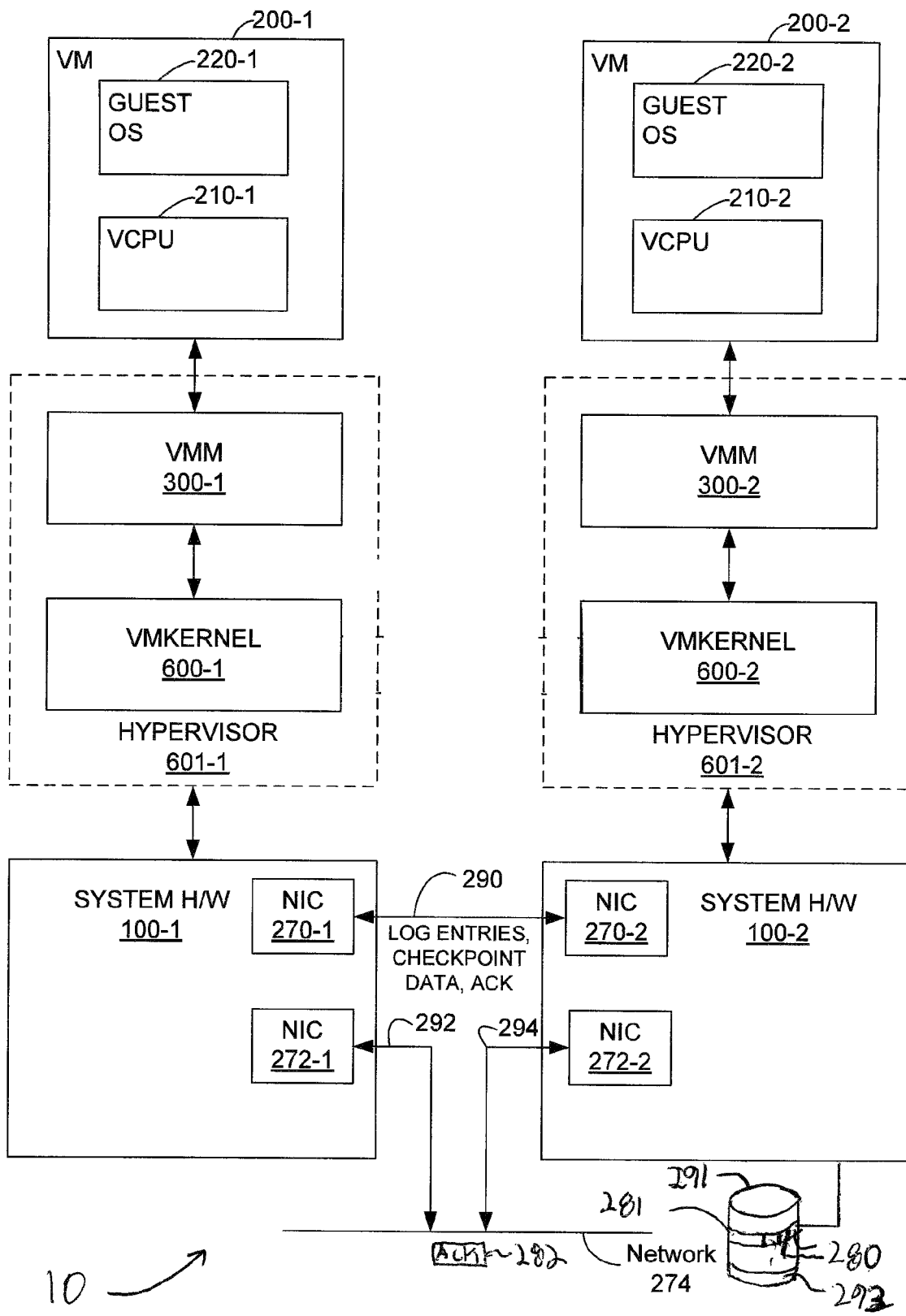
FIG. 2A illustrates a virtualized computer system that provides fault tolerance using a secondary, backup, VM to support a primary VM in accordance with one or more embodiments of the present invention.

FIG. 2A illustrates an example of a virtualized computer system 10 that comprises primary virtual machine 200-1 (VM 200-1) and secondary, backup, virtual machine (VM 200-2). In accordance with one or more embodiments of the present invention, primary VM 200-1 is communicating externally of virtualized computer system 10, and secondary, backup, VM 200-2 is configured to take over if a primary host computer, i.e., system H/W 100-1, where H/W means hardware, or primary VM 200-1 fails.

Primary VM 200-1 shown in FIG. 2A runs guest programs on guest operating system 220-1 (guest OS 220-1) using a virtualization layer, for example, hypervisor 601-1 (hypervisor 601-1 includes virtual machine monitor 300-1 (VMM 300-1) and VMKernel 600-1), as an intermediary to system H/W 100-1, as explained below in the Appendix in conjunction with FIG. 1. In addition, secondary VM 200-2 runs guest programs on guest OS 220-2 using a virtualization layer, for example, hypervisor 601-2 (hypervisor 601-2 includes VMM 300-2 and VMKernel 600-2) as an intermediary to system H/W 100-2, as explained below in the Appendix in conjunction with FIG. 1. As further shown in FIG. 2A, network interface cards (NICs) 272-1 and 272-2 may be used to communicate network packets 292 and 294 between system H/W 100-1 and system H/W 100-2, respectively, via physical network 274.

In accordance with one or more embodiments of the present invention, as primary VM 200-1 runs, i.e., executes various programs and instructions, referred to as guest programs and guest instructions, respectively; the virtualization layer (for example, primary VMM 300-1) captures information related to non-deterministic events that are directed to primary VM 200-1. A non-deterministic event is an event whose occurrence cannot be predicted by the virtualization layer, for example, by primary VMM 300-1, based on a current state of primary VM 200-1. Examples of non-deterministic events include, but are not limited to, disk transfer events, serial port events, parallel port events, network packet events, user interface (keyboard and mouse) events, etc. After capture, the virtualization layer (for example, VMM 300-1 and/or VMKernel 600-1), causes captured information concerning the non-deterministic events to be recorded, for example and without limitation, as log entries 280. Recording log entries 280 may be carried out in accordance with any one of a number of methods that are well known to those of ordinary skill in the art including storing log entries 280 in log file 281 on local disk storage 291, or storing log entries 280 in a log file in a file system (not shown) that is accessible over a network.

In accordance with one or more such embodiments, the virtualization layer, for example, VMkernel 600-1, corresponding to primary VM 200-1 sends log entries 280 to the virtualization layer, for example, VMkernel 600-2, corresponding to secondary VM 2001-2. Such log entries 280 may be transmitted between the virtualization layers using NICs 270-1 and 270-2 of system H/W 100-1 and 100-2, respectively, via physical network 290 shown in FIG. 2A In accordance with one or more such embodiments, secondary or backup VM 200-2 replays log entries 280. Here, "replay" means that backup VM 200-2 receives non-deterministic events defined by log entries 280 from its virtualization layer at an execution point that corresponds to the execution point at which primary VM 200-1 received the corresponding event from its virtualization layer. In this manner, divergence of execution between VM 200-1 and 200-2 can be minimized to the extent possible, if not entirely eliminated. In accordance with one or more such embodiments, the virtualization layer, for example, VMkernel 600-2, corresponding to secondary VM 200-2 sends acknowledgements 282 back to the virtualization layer, for example, VMkernel 600-1, corresponding to primary VM 200-1. Acknowledgements 282 may indicate that replay of the each log event 280 has completed on secondary VM 200-2. Acknowledgments 282 may be transmitted between NIC 270-1 of system H/W 100-1 and NIC 270-2 of system H/W 100-2.

Figure 2B:
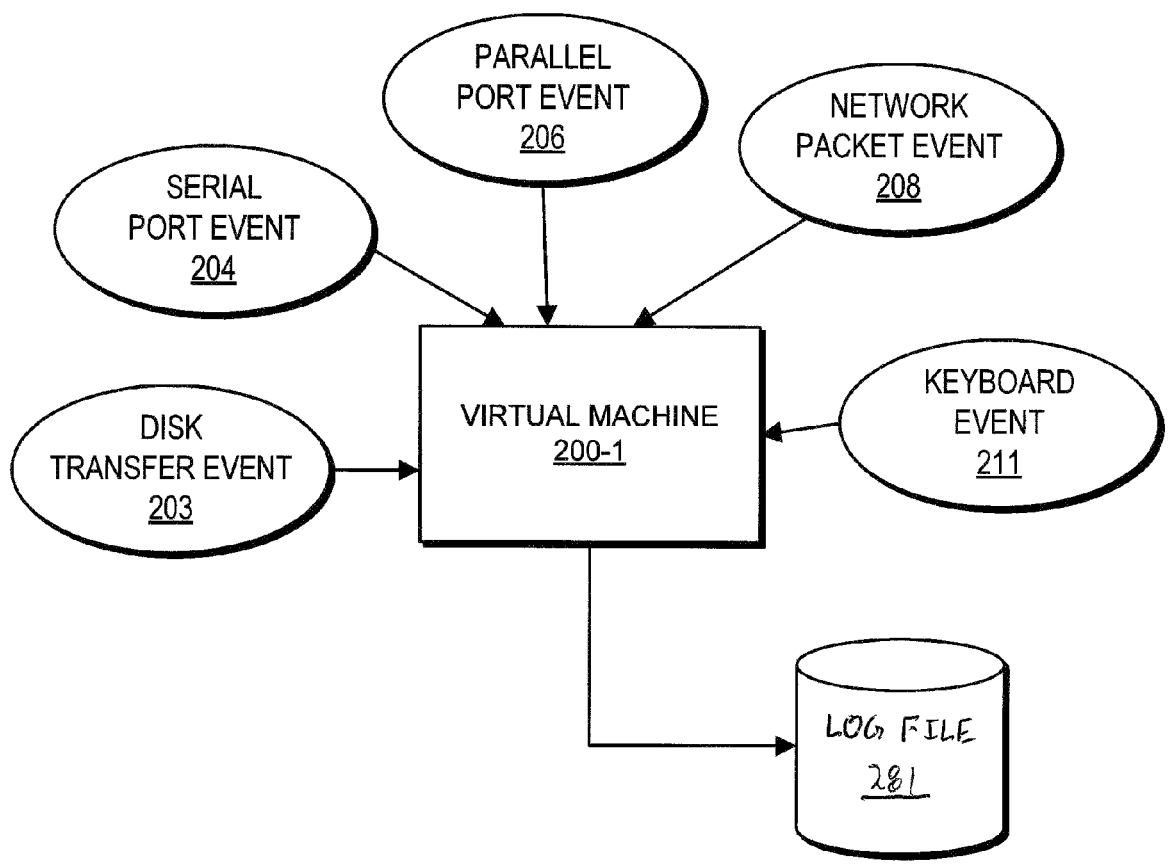
FIG. 2B illustrates an embodiment of a virtual computer environment.

In addition to fault tolerance applications such as that illustrated in FIG. 2A and described above, logging and replaying execution is useful for additional applications such as debugging and/or simulation analysis. For example, replaying execution allows a computer architect to perform an offline analysis of an execution sequence, and to peek into the state of internal registers at each stage of execution. A replay operation is premised on a principle that given an initial state of VM 200-1, VM 200-1 or VM 200-2 may be used to produce the same set of outputs during a replay operation that were produced when information related to non-deterministic events were captured by the virtualization layer of VM 200-1. In accordance with one or more such embodiments, the virtualization layer, for example and without limitation, VMM 300-1, corresponding to primary VM 200-1 causes: (a) information related to the initial state of VM 200-1 to be recorded (for example, in checkpoint file 293); and (b) non-deterministic events to be logged, beginning from the initial state of VM 200-1. For example, as illustrated in FIG. 2B, VM 200-1 can receive externally visible input/output (I/O) events from a number of different sources, such as, for example and without limitation, disk transfer events 203, serial port events 204, parallel port events 206, network packet events 208, keyboard events 211, etc. As described above, an event is non-deterministic because the virtualization layer, for example, VMM 300-1, corresponding to VM 200-1 cannot predict the occurrence of the event based on the current state of VM 200-1. Thus, in accordance with one or more such embodiments, during logging, each non-deterministic event is "time-stamped" with a current execution point, and stored in log file 281.

Replay of execution may be carried out by VM 200-1 or VM 200-2. For example, replay by secondary VM 200-2 begins by VM 200-2 executing from the initial state, as recorded in checkpoint file 293. Then, each non-deterministic event is inserted into the execution sequence of VM 200-2, based on log entries in log file 281. In particular, each non-deterministic event is inserted into the replayed execution sequence at the same execution point as that which occurred in the original instruction execution sequence in VM 200-1. By logging only non-deterministic events, the logging and replay system advantageously stores a minimal execution log. This reduces software overhead and storage requirements and improves performance. A logging and replay system for a VM is described in more detail in U.S. patent application Ser. No. 12/058,465 entitled "Replay of Input/Output Events for a Virtual Machine" filed on Mar. 28, 2008, listing Michael Nelson and Ganesh Venkitachalam, as inventors, and which is incorporated by reference herein.

In order to determine at which instruction in a sequence of instructions ("time-stamp") an external, non-deterministic event occurred during a logging phase, the virtualization layer, for example and without limitation, VMM 300-1, identifies an execution point at which the non-deterministic event occurred. The execution point is a measure of progress of the VM, in this example primary VM 200-1, from an initial known state, and represents the execution of a particular instruction in a stream of instructions executed by VM 200-1. In accordance with one or more such embodiments, the execution point is logged with the event, and the execution point indicates when the event occurred in the stream of executed instructions. During replay, VMM 300-2 monitors the execution point of the replayed instructions, and compares current execution points to logged execution points corresponding to the non-deterministic events. Then, in accordance with one or more such embodiments, virtual processor 210-2 (VCPU 210-2) of VM 200-2 is stopped when the current and logged execution points are the same so that the logged event can be injected into the execution stream at the appropriate execution point. By inserting logged events during replay at the appropriate execution point, it is ensured that the replayed execution will generate the same set of outputs as the originally logged execution.

Figure 3:
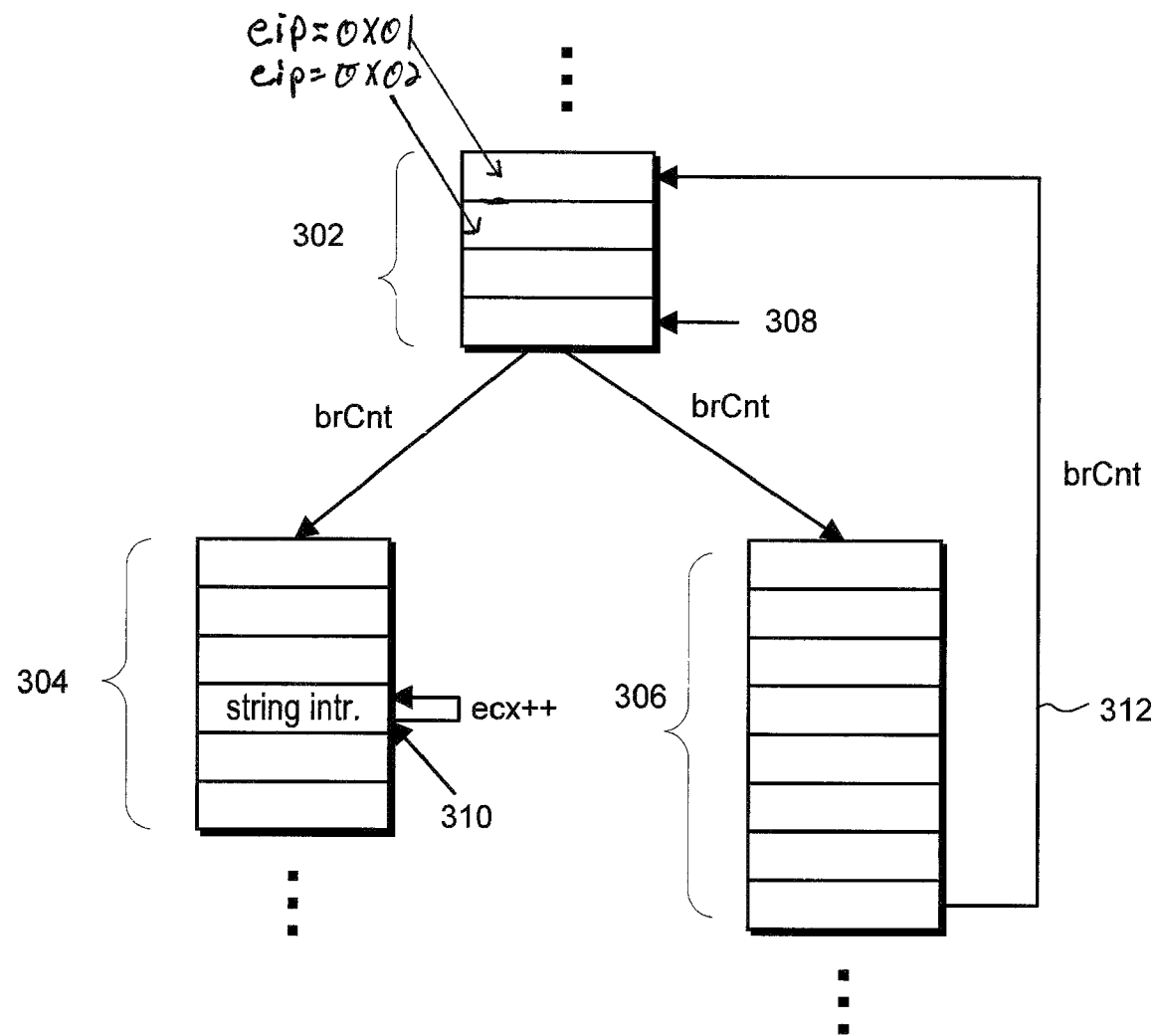
FIG. 3 shows a structure of a computer program in an x86 processor architecture comprising blocks of executable instructions to illustrate how an execution point can be tracked.

FIG. 3 shows a structure of a computer program in an x86 processor architecture comprising blocks 302, 304, and 306 of executable instructions to illustrate how an execution point can be tracked. In an x86 processor architecture, the execution point can be identified by a tuple {eip, brCnt, ecx}, where eip is an instruction pointer, brCnt is a branch counter, and ecx is an iteration counter. As shown in FIG. 3, each instruction is stored at a particular memory location in virtual memory (not shown) of a virtual machine (for example, VM 200-1 shown in FIG. 2A), which instruction is referenced by the instruction pointer (eip). The instruction pointer is ordinarily automatically incremented following execution of the referenced instruction, and the next instruction is then executed. For example, in block 302, virtual processor 210-1 (VCPU 210-1 of VM 200-1) executes an instruction at memory location 0x01 referenced by the instruction pointer (eip). The instruction pointer (eip) is then automatically incremented to reference an instruction at memory location 0x02, and so on. Because execution of a computer program is often iterative, however, the instruction pointer (eip) may point to any given instruction multiple times during execution of a program. For example, loop 312 may cause instructions in block 302 to be executed multiple times. Each time instructions in block 302 are executed, the instruction pointer (eip) loops through the same sequence of addresses (0x01, 0x02, etc.).

To distinguish between different execution iterations of the same instruction, the virtualization layer, for example, a virtual machine monitor—VMM 300-1 and VMKernel 600-1, shown in FIG. 2A—maintains a branch counter (brCnt), refer to FIG. 3. The branch counter (brCnt) represents the total number of branches executed by the virtual processor (for example, VCPU 210 shown in FIG. 2A, beginning from an initial state. In accordance with one or more embodiments of the present invention, a branch is executed when a branch instruction is executed. A branch is also executed when either an interrupt or an exception occurs. A branch instruction includes any instruction that interrupts an incremental update of the instruction pointer (eip), refers to FIG. 3, and causes the instruction pointer (eip) to instead jump to a particular instruction elsewhere in virtual memory. For example, as shown in FIG. 3, an instruction at location 308 of block 302 may represent a conditional branch that causes the instruction pointer (eip) to jump to either block 304 or block 306, depending on the current system state. A branch instruction may also correspond to, for example, a loop instruction, or a subroutine call.

Some types of instructions (for example, a string instruction at location 310 of block 304 in FIG. 3) are executed multiple times by the virtual processor (VCPU 210-1). These instructions execute multiple times without updating the branch counter (brCnt) or the instruction pointer (eip). In the x86 architecture, each iteration of such an instruction is automatically counted by an iteration counter (ecx). For example, the string instruction at location 310 executes multiple times, with each iteration incrementing the iteration counter (ecx). As will be apparent in view of FIG. 3 and the description above, an execution point provides a measure of progress of the virtual machine from an initial state, and the execution point can be uniquely defined by the tuple {eip, BrCnt, ecx}. As such, in accordance with one or more embodiments of the present invention, tracking this tuple provides a reliable timing mechanism that is used to identify an instruction among a sequence of instructions to tag nondeterministic events for logging and replay.

Figure 4:
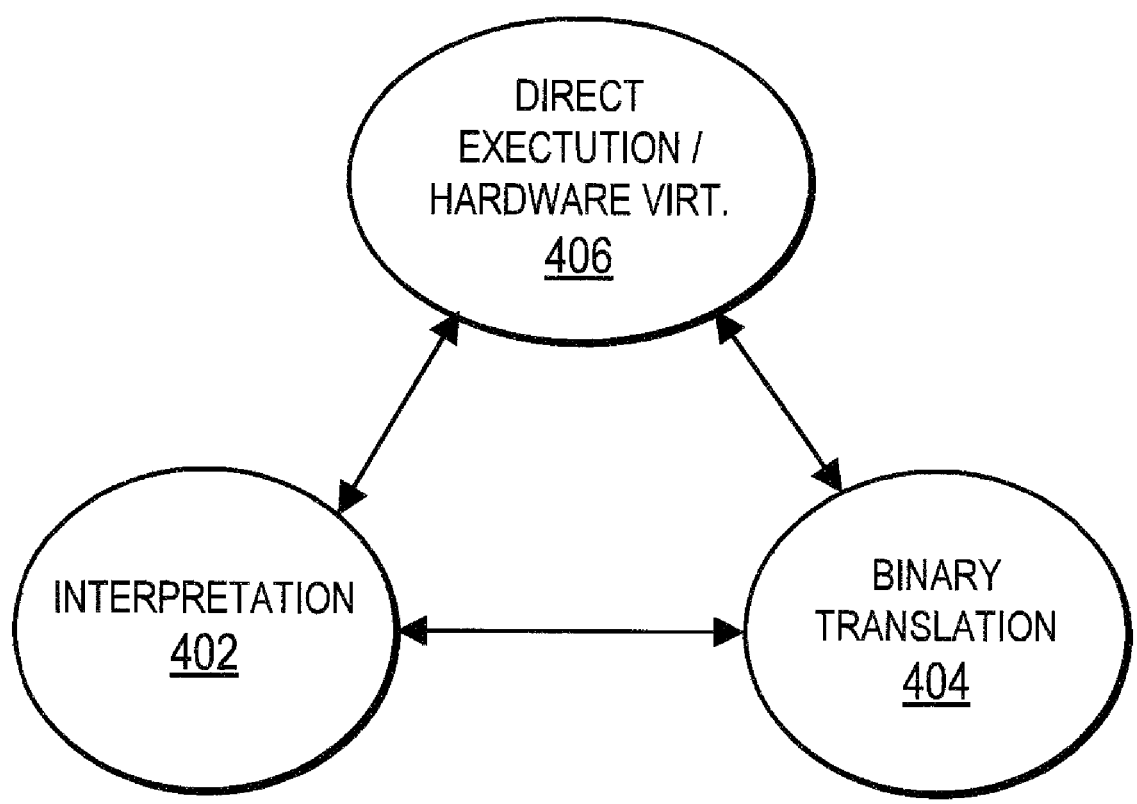
FIG. 4 is a state transition diagram that illustrates operating modes of a virtual machine monitor in accordance with one or more embodiments of the present invention.

FIG. 4 is a state transition diagram that illustrates operating modes of a virtual machine monitor (for example, VMM 300-1 shown in FIG. 2A) in accordance with one or more embodiments of the present invention. As shown in FIG. 4, VMM 300-1 can operate in one of three execution modes: interpretation mode 402, binary translation mode 404, and direct execution/hardware virtualization mode 406 (DE/HV 406). In interpretation mode 402, VMM 300-1 decodes guest instructions one at a time, and emulates an instruction via a sequence of instructions that are executable on system H/W 100-1. In binary translation mode 404, blocks of guest instructions are translated and stored in a translation cache 714 discussed more fully below with respect to FIG. 7. Because translated instructions can be accessed from translation cache 714 in subsequent iterations, binary translation mode 404, shown in FIG. 4, typically has less software overhead and offers higher performance than interpretation mode 402. In DE/HV mode 406, guest instructions are executed directly on system H/W 100-1. DE/HV mode 406 typically offers the highest performance. In some embodiments, direct execution and hardware virtualization can be considered two distinct execution modes. For example, Direct Execution (DE) generally refers to executing guest instruction directly on processors that lack hardware virtualization features, whereas Hardware Virtualization (HV) denotes executing guest instruction directly on processors equipped with hardware virtualization features such as an Intel VT processor or an AMD SVM processor. However, because similar methods are applied using direct execution and hardware virtualization, DE and HV modes are grouped together in the discussion that follows.

VMM 300-1 can dynamically switch between execution modes during execution of guest instructions. Furthermore, in accordance with one or more embodiments of the present invention, VMM 300-1 tracks execution points when switching between execution modes. Methods for dynamically determining and setting execution modes are described in further detail in U.S. patent application Ser. No. 12/057,191, entitled "Dynamic Selection and Application of Multiple Virtualization Techniques," filed on Mar. 27, 2008 and having Keith Adams and Jeffrey Sheldon listed as inventors, the disclosure of which is incorporated by reference herein.

Figure 5:
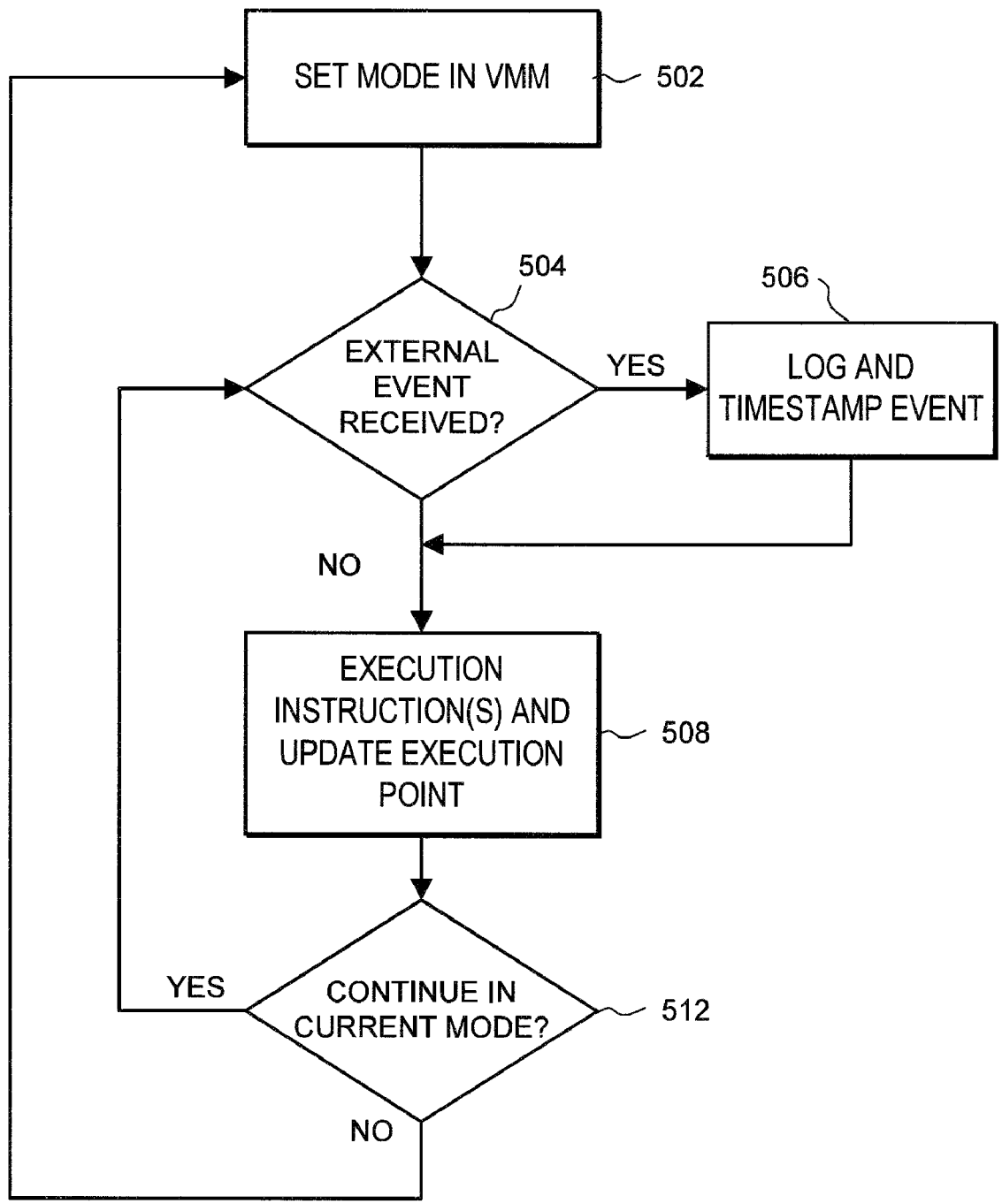
FIG. 5 is a flowchart that illustrates a method for logging events to capture an execution trace of a workload on a virtual machine in accordance with one or more embodiments of the present invention.

FIG. 5 is a flowchart illustrating a method for logging events to capture an execution trace of a workload on a virtual machine (for example, VM 200-1) in accordance with one or more embodiments of the present invention, where a virtual machine monitor (for example, VMM 300-1) provides multiple execution modes. As shown in FIG. 5, at step 502, VMM 300-1, shown in FIG. 2A, sets an execution mode for instructions of VM 200-1.

Referring again to FIG. 5, at decision step 504, throughout an execution sequence, VMM 300-1, shown in FIG. 2A, monitors for the occurrence of a non-deterministic event. If a non-deterministic event occurs, control is transferred to step 506, shown in FIG. 5. If non-deterministic event does not occur, control is transferred to step 508. At step 508, a virtual processor, for example, VCPU 210-1, shown in FIG. 2A, executes an instruction or set of instructions, and VMM 300-1 updates the execution point. The method of executing instructions and updating the execution point varies between execution modes and is described in more detail below with reference to FIGS. 6-9.

Figure 6:
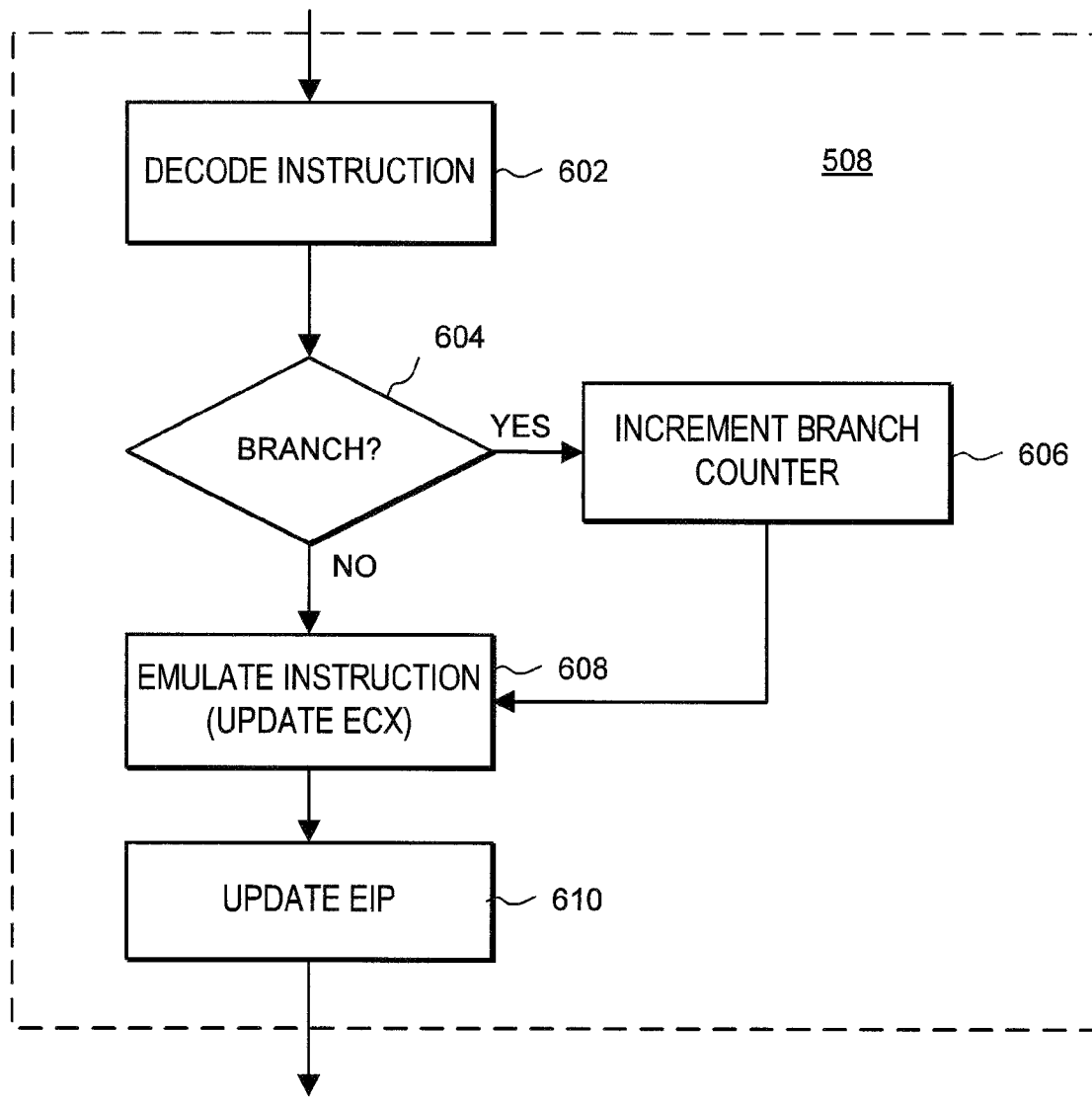
FIG. 6 is a flowchart that illustrates a method for executing instructions and tracking an execution point in interpretation mode in accordance with one more embodiments of the present invention.

Referring again to FIG. 5, at decision step 512, after execution of each instruction or set of instructions at step 508, VMM 300-1, shown in FIG. 2A, determines whether VM 200-1 will continue in the current execution mode. If a new execution mode is called for, then control is transferred back to step 502, shown in FIG. 5, to set the new execution mode. Otherwise, control is transferred back to step 504 to continue executing in the current mode. Due to differences in operation among each execution mode, a different method is used in each mode at step 508 to execute instructions and track an execution point. FIG. 6 is a flowchart illustrating a method for executing instructions and tracking an execution point in interpretation mode in accordance with one more embodiments of the present invention. In accordance with one or more such embodiments, an interpreter (not shown) in VMM 300-1, shown in FIG. 2A, maintains a software copy of the entire emulated machine state, including all the register values. In an x86 architecture, for example, the instruction pointer (eip), shown in FIG. 3, and iteration counter (ecx) map directly to data values stored in registers of system H/W 100-1, shown in FIG. 2A. These data values are readily available to the VMM 300-1. Thus, the interpreter (not shown) is configured to count branch instructions using a software counter.

Referring again to FIG. 6, at step 602, the interpreter (not shown) decodes a received instruction. At decision step 604, the interpreter (not shown) determines whether the instruction is a branch instruction. If the instruction is a branch instruction, control is transferred to step 606 where the software branch counter (brCnt) is incremented. Otherwise, control is transferred to step 608, shown in FIG. 6. At step 608, the instruction is emulated via a sequence of instructions that are executable on system H/W 100-1. If the instruction is an iterative instruction (e.g., a string instruction) the iteration counter (ecx), shown in FIG. 3, is updated during emulation of the iterative instruction. Referring again to FIG. 6, at step 610, the instruction pointer (eip) is automatically updated.

Figure 7:
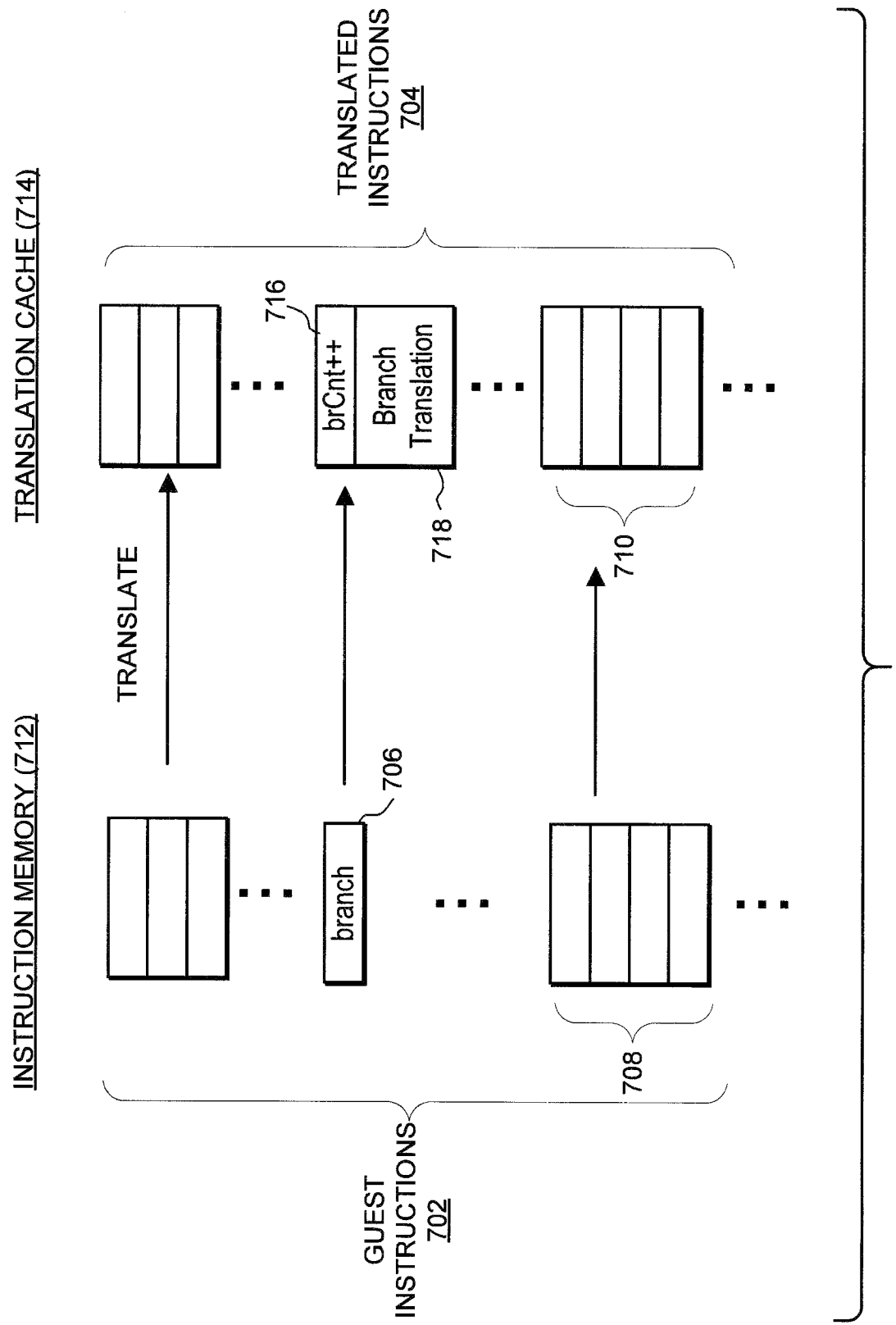
FIG. 7 helps illustrate operation of a binary translator in accordance with one or more embodiments of the present invention.

FIG. 7 helps illustrate operation of a VMM 300-1, shown in FIG. 2A, in binary translation mode 404, shown in FIG. 4. To that end, VMM 300-1, shown in FIG. 2A, includes a binary translator (not shown) in accordance with one or more embodiments of the present invention. As shown in FIG. 7, a block of guest instructions 702 is stored in instruction memory 712 located in virtual memory of VM 200-1, shown in FIG. 2A. Referring again to FIG. 7, the binary translator (not shown) translates the block of guest instructions 702 into a block of translated instructions 704 that are directly executable by system H/W 100-1, shown in FIG. 2A, and stores translated instructions 704, shown in FIG. 7, in translation cache 714 in VMM 300-1, shown in FIG. 2A. Because blocks of instructions are often executed repeatedly, a subsequent iteration of the block of guest instructions 702, shown in FIG. 7, does not need to be translated again, but can instead, can execute from translation cache 714. For example, when the instruction pointer (eip), shown in FIG. 3, reaches block of guest instructions 708, shown in FIG. 7, the instructions are translated and stored in translation cache 714 as block of translated instructions 710. If block of guest instructions 708 is executed again, for example, in a subsequent iteration, VMM 300-1, shown in FIG. 2A, directly executes block of translated instructions 710, shown in FIG. 7, from translation cache 714. This reduces software overhead, and allows binary translator (not shown) to generally operate more efficiently than an interpreter (not shown).

To count branch instruction 706, the binary translator (not shown) extends the branch instruction translation to include instructions to update the software branch counter (brCnt), shown in FIG. 3. In accordance with one or more such embodiments, as shown in FIG. 7, the binary translator (not shown) appends prefix 716 to the actual translated instructions 718 of branch instruction 706. In accordance with one or more such embodiments, prefix 716 comprises an instruction to increment a software branch counter when the block of translated instructions is executed. As a result, whenever the translation of the guest branch instruction is executed, the software branch counter is incremented by the special translation to determine the branch count. As will be apparent to one of ordinary skill in the art, alternative methods for determining the branch count are also possible that do not directly increment a software counter. A method for translating branch instructions in a binary translator (not shown) is described in more detail in U.S. Pat. No. 6,711,672 B1 to Agesen, entitled "Method and System for Implementing Subroutine Calls and Returns in Binary Translation Sub-Systems of Computers" issued on Mar. 23, 2004.

Figure 8:
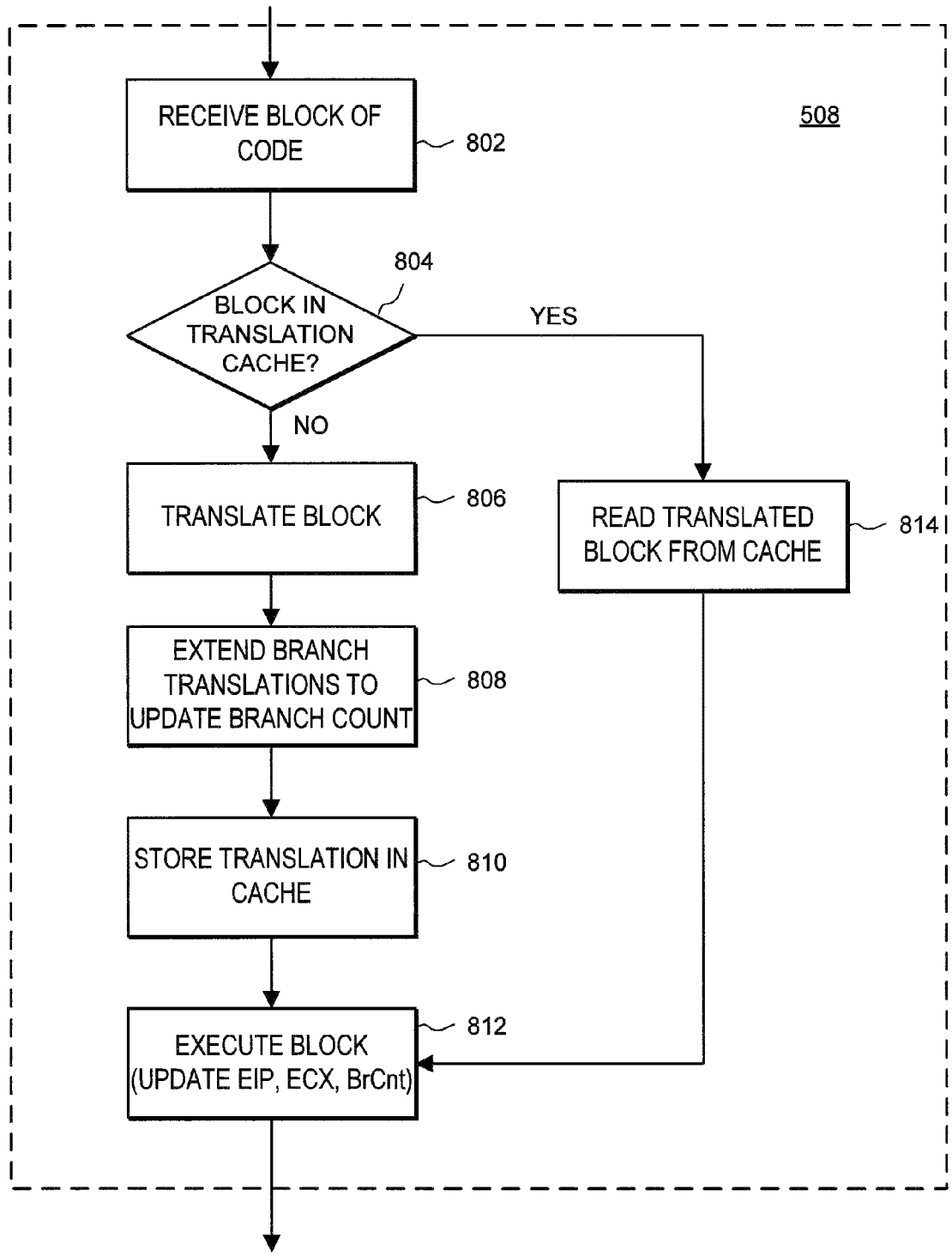
FIG. 8 is a flowchart that illustrates a method for executing instructions and tracking an execution point in binary translation mode in accordance with one more embodiments of the present invention.

FIG. 8 is a flowchart that illustrates a method for executing instructions and tracking an execution point in binary translation mode 404, shown in FIG. 4, in accordance with one more embodiments of the present invention. Referring again to FIG. 8, at step 802, a block of code is received from guest instruction memory 712, shown in FIG. 7. Then, at decision step 804, shown in FIG. 8, the VMM, for example, VMM 300—shown in FIG. 2A, determines whether a translation of the received block is already stored in translation cache 714, shown in FIG. 7. If a translation is already stored, then control is transferred to step 814, shown in FIG. 8, where the translation is read from translation cache 714, shown in FIG. 7, and control transferred to step 812, shown in FIG. 8. However, if, a translation is not available in translation cache 714, shown in FIG. 7, (or is no longer valid), then control is transferred to step 806, shown in FIG. 8. At step 806, VMM 300-1, shown in FIG. 2A, invokes the binary translator (not shown) to translate the block of guest instructions to a block of instructions that are executable by host processor(s) (for example, processor(s) in system H/W 110-1).

Referring again to FIG. 8, at step 808, which can also be performed as part of the translation operation of step 806, the binary translator (not shown) extends the branch translation with an instruction to increment a branch count (for example, by appending a prefix to the actual translation of any branch instruction). At step 810, the translated block is stored in translation cache 714, shown in FIG. 7, and the translated block can be executed directly from translation cache 714 in subsequent iterations of the block of code. At step 810, shown in FIG. 8, the translated block of code is executed, and the execution point, which may be represented by the tuple {eip, brCnt, ecx}, is updated. Because an instruction to increment a branch counter (brCnt) was inserted into the translation of the branch instruction, the branch counter (brCnt) will automatically update whenever a branch instruction executes from translation cache 714, shown in FIG. 7. To determine instruction pointer (eip) and iteration counter (ecx), shown in FIG. 3, values in binary translation mode 404, shown in FIG. 4, VMM 300-1 includes a synchronization map to associate regions of translation cache 714, shown in FIG. 7, with the addresses of instructions used as the source of the translation, and information that identifies how the translation was performed. An example system is described in more detail in U.S. Pat. No. 6,397,242 to Devine, et al., entitled "Virtualization System Including a Virtual Machine Monitor for a Computer with a Segmented Architecture" issued on May 28, 2002.

In DE/HV mode 406, shown in FIG. 4, a VMM, for example, VMM 300-1 shown in FIG. 2A, executes guest instructions directly on processors in host system hardware, for example, system H/W 100-1. Many modern processors operate using hardware assisted virtualization technologies such as, for example, Intel VT and AMD SVM. For purposes of this disclosure, DE/HV mode 406, shown in FIG. 4, includes all types of execution of unmodified guest instructions on processor(s) in underlying system hardware, for example, system H/W 110-1, shown in FIG. 2A. This includes traditional execution of user-level code on legacy processors as well as executing guest kernel and user code at all rings of protection on Intel VT and AMD SVM enabled processors. The exact implementation details vary from processor to processor, and depend on whether Intel VT/AMD SVM virtualization technologies are used. However, the underlying mechanism is similar in all cases, and is described below.

Figure 9:
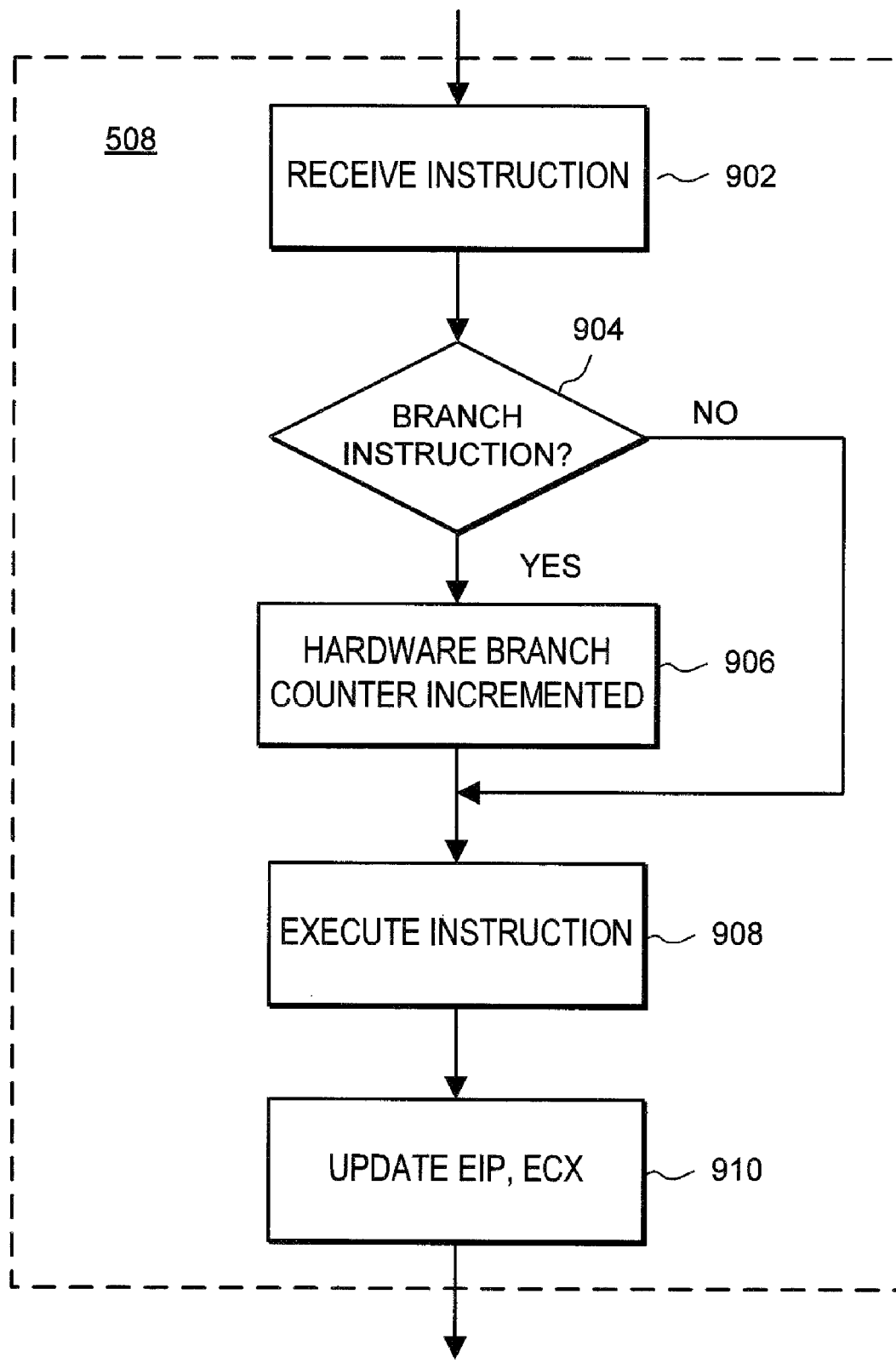
FIG. 9 is a flowchart that illustrates a method for executing instructions and tracking an execution point in direct execution/hardware virtualization mode in accordance with one more embodiments of the present invention.

FIG. 9 is a flowchart that illustrates a method for executing instructions and tracking an execution point in direct execution/hardware virtualization (DE/HV) mode 406, shown in FIG. 4, in accordance with one more embodiments of the present invention. When executing in DE/HV mode 406, a branch count is determined using performance counters (not shown) or a similar hardware resource that can be configured to count guest branch instructions (modern processors generally provide this capability). Referring to FIG. 9, at step 902, an instruction is received by a hardware execution engine of a processor. At step 904, the hardware execution engine determines if the instruction is a branch instruction. If the instruction is a branch instruction, control is transferred to step 906 where the hardware execution engine automatically increments the branch counter; otherwise control is transferred to step 908. At step 908, the received instruction is executed by the physical processor of the system hardware, for example, system H/W 110-1 shown in FIG. 2A. Referring again to FIG. 9, at step 910, the instruction pointer (eip) and iteration counter (ecx), shown in FIG. 3, are updated, and stored in hardware registers of the host processor. The hardware registers can be read by the VMM, for example, VMM 300-1 shown in FIG. 2A).

In accordance with one or more such embodiments, a virtualization layer, for example, a VMM, such as VMM 300-1, enables the hardware counters when a virtual machine, for example, VM 200-1 is placed in DE/HV mode 406, shown in FIG. 4, and disables the hardware counters each time the virtual machine, for example, VM 200-1, shown in FIG. 2A,) exits DE/HV mode 406, shown in FIG. 2A. By enabling the hardware counters only when the virtual machine is in DE/HV mode 406, and disabling the hardware counters in other execution modes, the VMM, for example, VMM 300-1 shown in FIG. 2A, ensures that only guest branch instructions are counted. In accordance with one or more further embodiments, a performance counter (not shown) can be configured to count only branches executed at a particular privilege level, for example, a privilege level where guest instructions operate (e.g., privilege level "CPL3" in x86 architecture). Therefore, a performance counter (not shown) need only be configured once, instead of enabling/disabling the counter on each transition to/from DE/HV mode 406, shown in FIG. 4. As one will readily appreciate, one or more such embodiments assume that a guest runs at a specified privilege level when in DE/HV mode 406, and that the VMM, for example, VMM 300-1, shown in FIG. 2A, itself does not run at that privilege level. This ensures that only guest branch instructions are counted, and not branch instructions executed by the virtualization software, or of other concurrently executing VMs, such as VM 200-1 and 200-2.

Further embodiments of the described method will be apparent to those of ordinary skill in the art depending on the specific type of processor used. For example, on Intel VT enabled processors, counters can be configured by programming VMCS entry and exit controls to load a guest copy of a global control register on entry and to load a corresponding host copy on exit. VMCS is a data structure used by the processor to store the state of the virtual machine, for example, VM 200-1, as well as various global control registers. The global control registers are configured to count guest branches only, and the counter is stopped while the processor executes in "root mode" where root mode refers to a hardware execution mode where VMM instructions are executed. The opposite of root mode is a "non-root mode" where guest instructions are executed. These two modes are meaningful only in a hypervisor mode of VMM execution because root/non-root modes are hardware execution modes, like CPL0 and CPL3, and not VMM execution modes, like interpretation mode and binary translation mode. On AMD SVM enabled processors, counting can be implemented in a manner similar to implementation mode for systems without virtualization support. In particular, GuestOnly/HostOnly bits in event selectors are set up to count guest branches at all protection rings. The remaining components of the tuple, i.e., eip and ecx, can be extracted from the hardware by either saving them directly or by extracting them from an exception frame. Intel VT and AMD SVM enabled processors provide support for reading guest registers values from a state saved by the processors.

Figure 10:
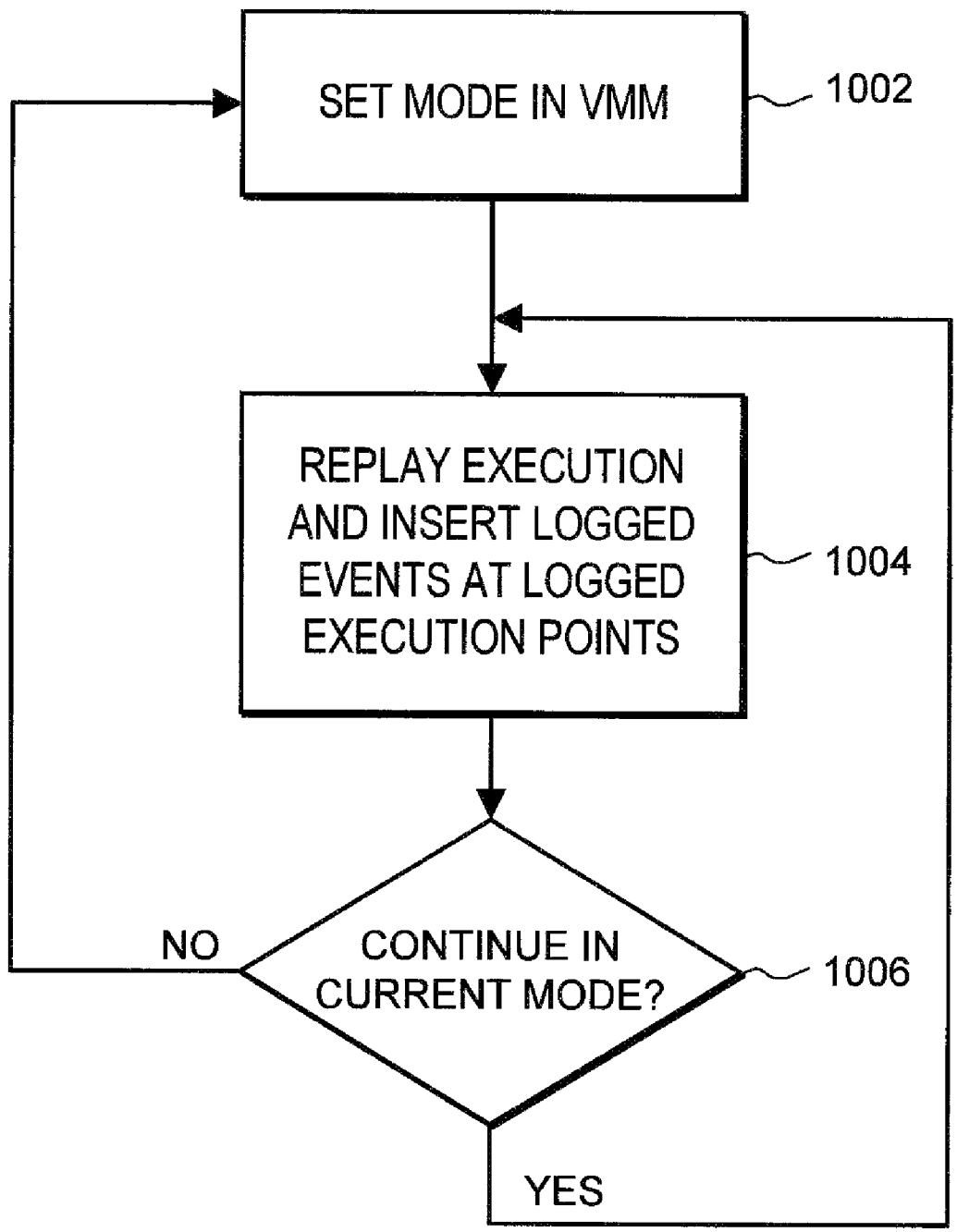
FIG. 10 is a flowchart that illustrates a method for replaying execution in accordance with one more embodiments of the present invention.

Methods for replaying execution from log file 281 in accordance with one more embodiments of the present invention are now described with reference to FIGS. 10-13. Referring first to FIG. 10, a method for replaying execution of a virtual machine in accordance with one more embodiments of the present invention. As with logging, the replay VM, for example VM 200-2 shown in FIG. 2A, can dynamically switch between the execution modes illustrated in FIG. 4. Referring again to FIG. 10, at step 1002, a VMM in the replay VM, for example VMM 300-2 shown in FIG. 2A, sets an appropriate execution mode. At step 1004, shown in FIG. 10, execution is replayed, beginning from a known initial state from which logging began. Logged non-deterministic events are inserted into the execution sequence precisely at the execution point at which the non-deterministic events occurred during logging. Details of method for carrying out the operation of step 1004 in accordance with one or more embodiments of the present invention in each of the execution modes are described below in conjunction with FIGS. 11-13. After execution of an instruction or set of instructions, control is transferred to decision step 1006, shown in FIG. 10. At decision step 1006, the VMM in the replay VM, for example VMM 300-2 shown in FIG. 2A, determines if the replay VM, for example VM 200-2, will continue operating in the current execution mode. If the execution mode is to change, then control is transferred to step 1002, shown in FIG. 10, wherein the new execution mode is set; otherwise control is transferred directly to step 1004 for continued replay of the execution sequence. The method then iterates accordingly.

Figure 11:
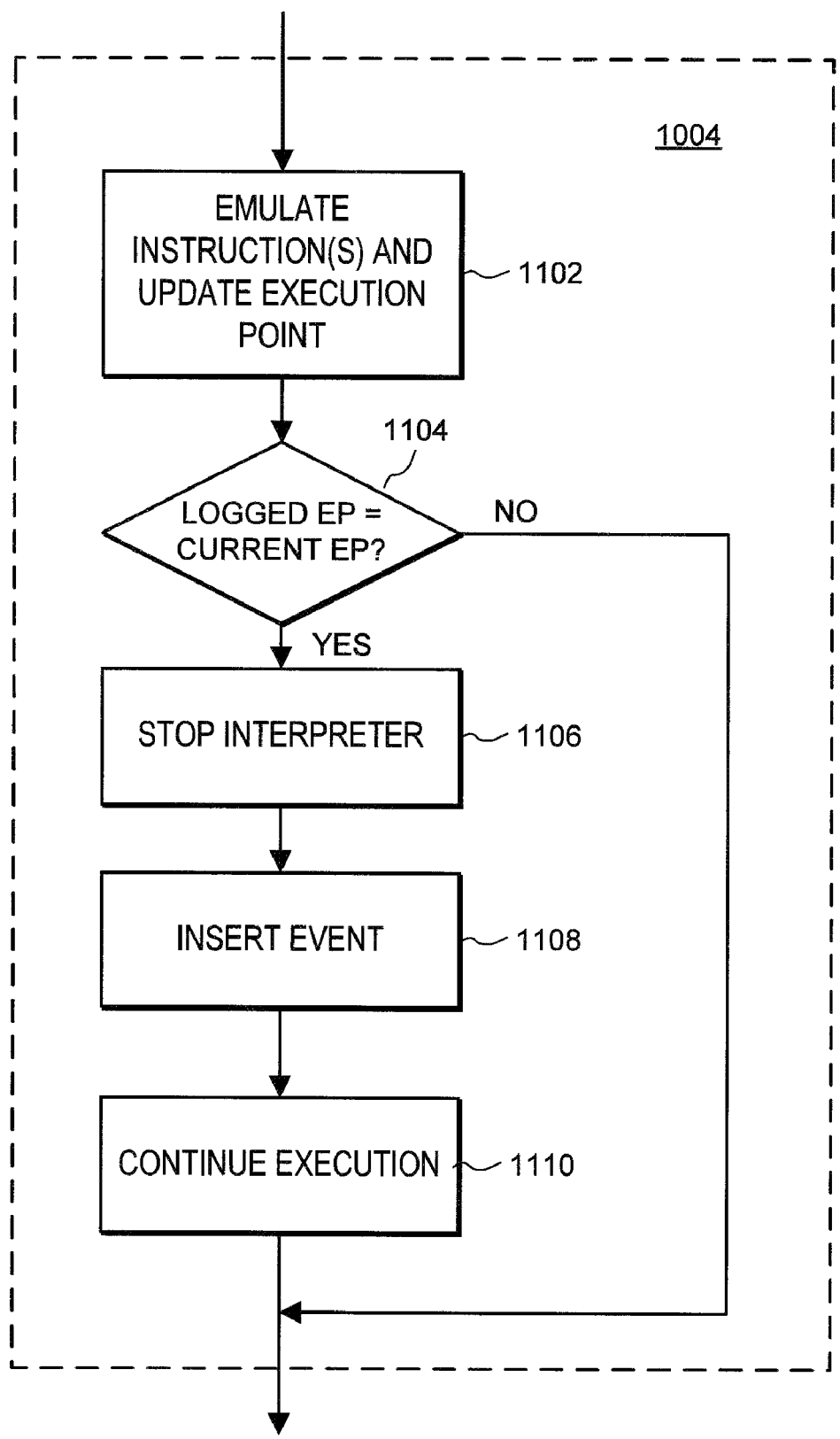
FIG. 11 is a flowchart illustrating a method for replaying execution in interpretation mode in accordance with one or more embodiments of the present invention.
Figure 12:
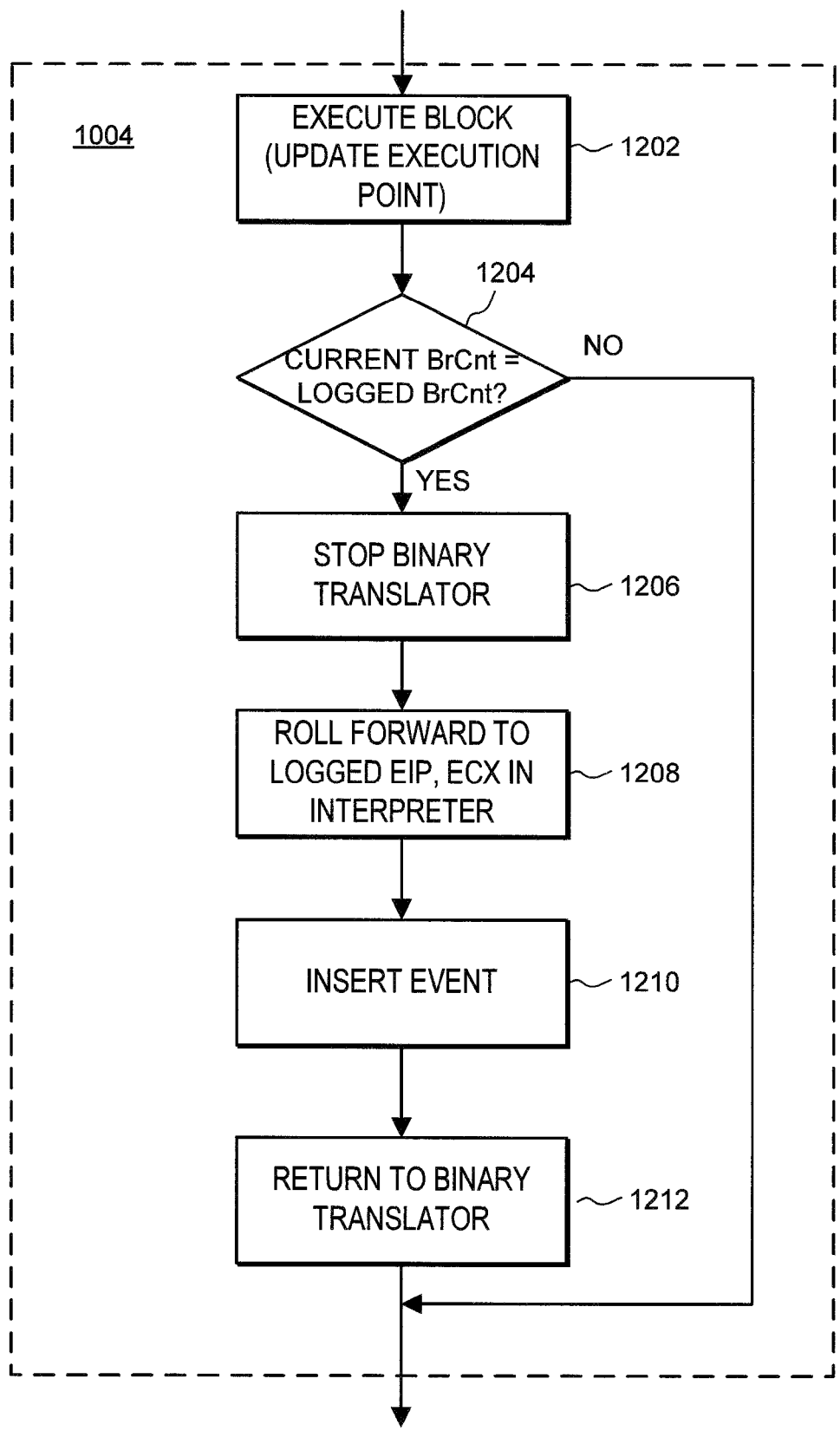
FIG. 12 is a flowchart illustrating a method for replaying execution in binary translation mode in accordance with one or more embodiments of the present invention.
Figure 13:
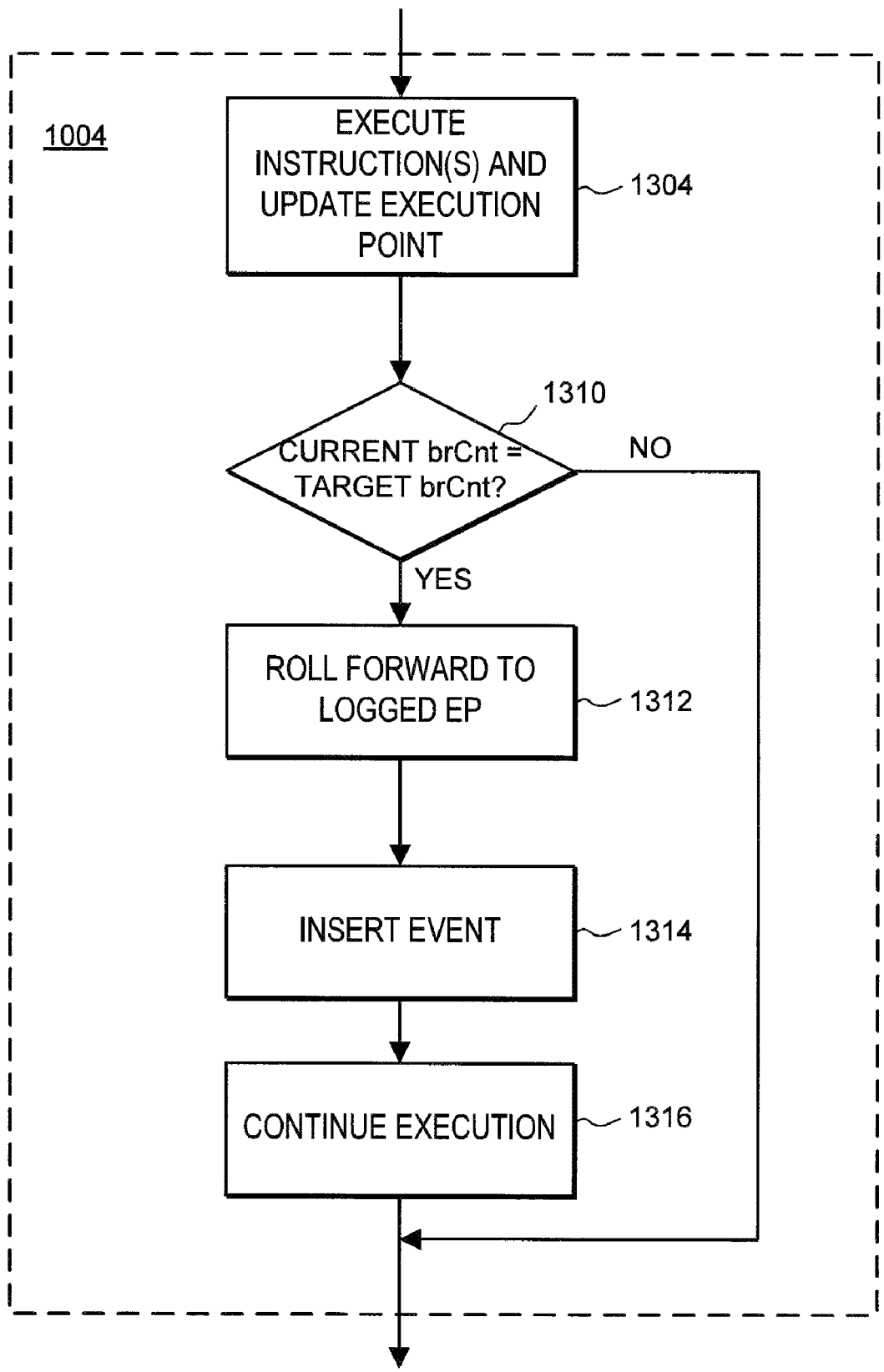
FIG. 13 is a flowchart illustrating a method for replaying execution in direct execution/hardware virtualization mode in accordance with one or more embodiments of the present invention.

FIGS. 11-13 are flowcharts that illustrate methods for carrying out the operation shown at step 1004 of FIG. 10 in interpretation mode, binary translation mode, and direct execution/hardware virtualization mode, respectively, in accordance with one more embodiments of the present invention. FIG. 11 is a flowchart illustrating a method for replaying execution in interpretation mode 402, shown in FIG. 4, in accordance with one or more embodiments of the present invention. Referring to FIG. 1, at step 1102, the interpreter (not shown) emulates the guest instructions, and updates the execution point. In accordance with one or more such embodiments, step 1102 is carried out according to the method previously described in conjunction with FIG. 6. Thus, after each replayed instruction, the interpreter (not shown) knows the current execution point within the replaying instruction sequence. At decision step 1104, shown in FIG. 1, the interpreter (not shown) compares the current execution point to a logged execution point in log file 281, shown in FIG. 2A. If a match is found, control is transferred to step 1106, shown in FIG. 11 otherwise, the method skips steps 1106-1110. At step 1106, the VMM, for example VMM 300-2 shown in FIG. 2A stops the interpreter (not shown). Referring to FIG. 11, at step 1108, the VMM inserts the logged event into the execution sequence. At step 1110, execution is continued by restarting the interpreter (not shown).

FIG. 12 is a flowchart illustrating a method for replaying execution in binary translation mode 404, shown in FIG. 4, in accordance with one or more embodiments of the present invention. At step 1202, shown in FIG. 12, blocks of instructions corresponding to translated guest instructions are executed. During execution, the execution point automatically updates in the manner described above in conjunction with FIG. 8. As previously described, executing a block of instructions in binary translation mode 404, shown in FIG. 4 comprises determining if the translated block is already in the translation cache, and if it is not in the cache, translating the block and storing the translated instructions in translation cache 714, shown in FIG. 7. Branch instructions are translated by extending the actual translation of the branch instruction to cause the branch counter to update. At decision step 1204, shown in FIG. 12, the number of executed branches is compared to a number of branches indicated by log file 281. In accordance with one or more embodiments, a branch counter (brCnt), shown in FIG. 3, is initialized to zero when replay begins, and is incremented until the branch counter (brCnt), reaches the logged value. In accordance with one or more further embodiments, the branch counter (brCnt) may be initially loaded with the next logged value, and it is decremented until it reaches zero. In accordance with such embodiments, the "next logged value" refers to the next value at the time execution of the VM, such as VM 200-1 shown in FIG. 2A, is halted to begin the replay.

Referring again to FIG. 12, at step 1204, when the branch count reaches the branch count by log file 281, shown in FIG. 2A, control is transferred to step 1206, shown in FIG. 12, otherwise, steps 1206-1212 are skipped. At step 1206, the VMM, for example, VMM 300-2 shown in FIG. 2A, stops the binary translator (not shown) and enters a "roll-forward" process. At step 1208, shown in FIG. 12, the roll-forward process steps through the remaining instructions until the instruction pointer (eip) and iteration counter (ecx), shown in FIG. 3, also match logged values therefor. In accordance with one or more such embodiments, the VMM, such as VMM 300-1 shown in FIG. 2A, rolls forward by switching control to the interpreter (not shown), and executing the method described above in conjunction with to FIG. 11. When the matching execution point is reached, control is transferred to step 1210, shown in FIG. 12. At step 1210, the VMM inserts the logged event into the execution sequence. At step 1212, control is then transferred to the binary translator (not shown), or to a different execution mode.

FIG. 13 is a flowchart illustrating a method for replaying execution in DE/HV mode 406, shown in FIG. 4, in accordance with one or more embodiments of the present invention. Typically, hardware performance counters (not shown) are enabled when entering DE/HV mode 406, and are disabled upon exiting DE/HV mode 406. The performance counters (not shown) can be configured to count executed guest branch instructions. In accordance with one or more such embodiments, a performance counter (not shown) is configured to generate a Performance Monitoring Interrupt (PMI) on a performance counter overflow. Then, to count branch instructions, the performance counter (not shown) can, for example, be configured with a negative value whose magnitude equals a target branch count of branch instructions, the target branch count is typically less than or equal to the branch count of the next logged event in log file 281. The overflow interrupt is triggered when the performance counter (not shown) reaches zero; this signifies that the number of replayed branch instructions equals the number of branches corresponding to the target execution point.

Referring again to FIG. 13, at step 1304, a hardware processor (for example, a hardware processor of system H/W 110-2, shown in FIG. 2A, executes instruction(s), and updates the execution point according to the method described above in conjunction with FIG. 9. As described above, if the instruction is a branch instruction, the hardware branch counter is automatically updated. At decision step 1310, shown in FIG. 13, an interrupt may be triggered by the hardware processor after it has executed a number of branches that causes the performance counter (not shown) to overflow. If so, control is transferred to an interrupt routine where steps 1312, 1314, and 1316 are performed, otherwise, steps 1312-1316 are skipped. At step 1312, the VMM, for example, VMM 300-2 shown in FIG. 2A, switches control to the interpreter (not shown) or the binary translator (not shown), and rolls forward until the matching execution point is reached using the methods described above in conjunction with FIGS. 11-12. Referring to FIG. 13, at step 1314, the VMM 300-2, shown in FIG. 2A, inserts the logged event into the execution sequence. At step 1316, shown in FIG. 13, the VMM 300-2 shown in FIG. 2A returns control to DE/HV mode or switches modes to continue execution.

In accordance with one or more such embodiment, the target branch instruction count is set lower than the actual number of branch instructions indicated by log file 281 to account for significant interrupt delivery latency that is inherent to most modern processors. This latency dictates that if a counter is set to generate an interrupt after counting N branches, the interrupt may actually be generated anywhere between N and N+e branches, where e is a known maximum latency specific to the processor. Thus, due to the latency, it is possible that if the VMM, for example, VMM 300-2, is configured to stop execution of the VM, for example, VM 200-2, after N branches, it may actually not stop until as many as N+e branches. If this happens, the VMM, for example, VMM 300-2, will be unable to insert the non-deterministic event at the correct execution point. To account for the latency, in accordance with one or more such embodiments, the target branch instruction count used at step 1310 shown in FIG. 13, is set to N−e branch instructions. Then, when the target branch count is reached, the VMM 300-2, shown in FIG. 2A, switches control to the binary translator (not shown) or the interpreter (not shown), and rolls forward until the matching execution point is reached.

As discussed above with respect to FIG. 4, DE/HV mode 406 typically offers the highest level of performance, and it is desirable to reduce time in the roll-forward process using the interpreter (not shown) or the binary translator (not shown). The Interpreter (not shown)s may be orders of magnitude slower than hardware execution, and invoking the binary translator (not shown) at a high rate may increase processor and memory usage. Thus, to minimize roll forward overhead, hardware breakpoints can be used to roll-forward in DE/HV mode 406 as illustrated in the timeline of FIG. 14 instead of switching control to the interpreter (not shown) or the binary translator (not shown).

Figure 14:
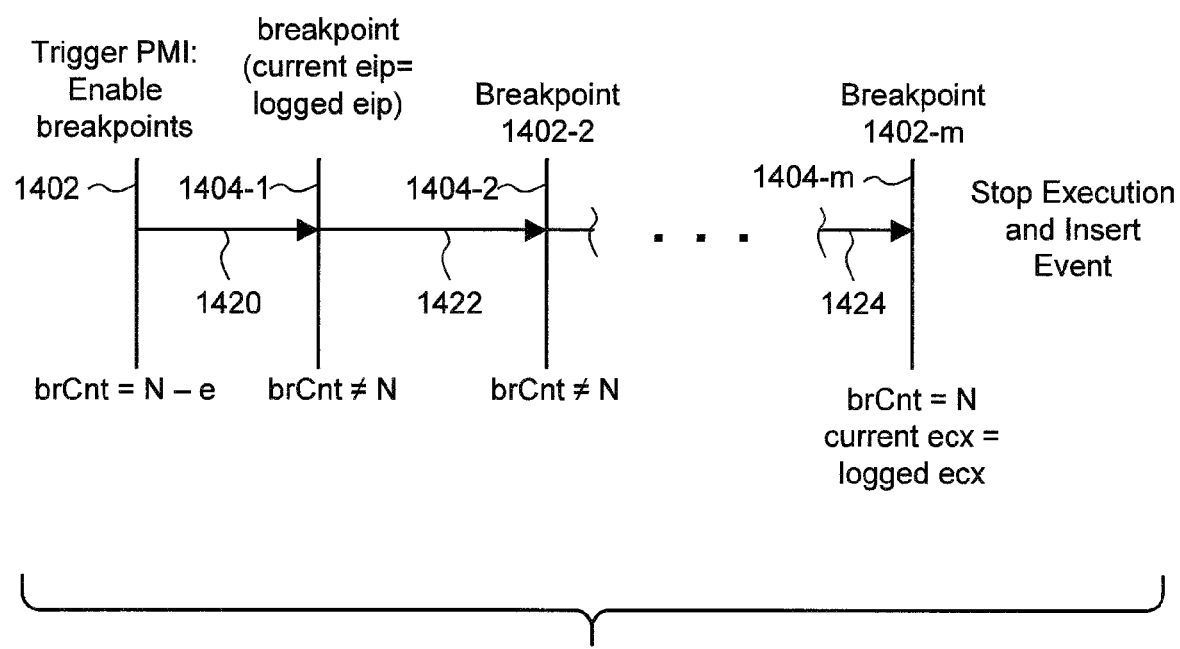
FIG. 14 is a timeline illustrating a method for replaying execution in direct execution/hardware virtualization mode using hardware breakpoints in accordance with one more embodiments of the present invention.

FIG. 14 is a timeline illustrating a method for replaying execution in direct execution/hardware virtualization mode using hardware breakpoints in accordance with one more embodiments of the present invention. In accordance with one or more such embodiments, as shown in FIG. 14, the performance monitor interrupt (PMI) is triggered (for example, at execution point 1402) when the branch counter equals N−e. Then, a hardware breakpoint is enabled to trigger when the current instruction pointer (eip) next matches the logged instruction pointer, and execution continues in DE/HV mode 406, shown in FIG. 4. When this breakpoint is triggered, for example, at 1404-1, the remaining elements of the tuple (i.e., brCnt and ecx) are compared against the corresponding logged values. If the branch counter (brCnt) or the iteration counter (ecx) values do not match the logged values, a new such breakpoint is set, and execution continues in DE/HV mode 406, shown in FIG. 4, until the next breakpoint is reached. This method continues for as many breakpoints, for example, 1404-1 to 1404-m, shown in FIG. 14, are needed to reach the matching execution point, e.g., execution point 1404-m.

In accordance with one or more such embodiments, the VMM, for example VMM 300-2 shown in FIG. 2A, can dynamically determine whether to roll-forward in DE/HV mode 406, shown in FIG. 4 or to switch control to the binary translator (not shown) and/or the interpreter (not shown). For example, if the breakpoint is located within a tight loop, it may be triggered many times prior to reaching the logged execution point, for example at breakpoint 1404-m, shown in FIG. 14. This may cause DE/HV mode 406, shown in FIG. 4, roll-forward to be less efficient than a software based roll-forward process. If such behavior is observed, the VMM, for example VMM 300-2. shown in FIG. 2A, can exit the DE/HV roll-forward, and instead roll-forward using the binary translator (not shown) or the interpreter (not shown) as described above.

One or more embodiments of the present invention may be used to advantage in both a hosted and a non-hosted virtualized computer system, regardless of the degree of virtualization, in which the virtual machine(s) have any number of physical and/or logical virtualized processors. In addition, such one or more embodiments may also be implemented directly in a computer's primary operating system (OS), both where the OS is designed to support virtual machines, and where it is not.

Upon reading this disclosure, those of skill in the art will appreciate still additional alternative embodiments through the disclosed principles. Thus, while particular embodiments and applications have been illustrated and described, it is to be understood that the disclosure is not limited to the precise construction and components disclosed herein. Various modifications, changes and variations which will be apparent to those skilled in the art may be made in the arrangement, operation and details of the method and apparatus of the embodiments disclosed herein without departing from the spirit and scope of the disclosure as defined in the appended claims.

Appendix Relating to Virtualized Computer Systems

As is well known in the field of computer science, a virtual machine (VM) is an abstraction—a "virtualization"—of an actual physical computer system. FIG. 1 shows one possible arrangement of computer system 700 that implements virtualization. As shown in FIG. 1, virtual machine (VM) or "guest" 200 is installed on a "host platform," or simply a "host," which includes system hardware, that is, hardware platform 100 of computer system 700, and one or more layers or co-resident components comprising system-level software, such as an operating system or similar kernel, or a virtual machine monitor or hypervisor (see below), or some combination of these. System hardware 100 typically includes one or more processors 110, memory 130, some form of mass storage 140, and various other devices 170.

Each VM 200 will typically have both virtual system hardware 201 and guest system software 202. The virtual system hardware typically includes at least one virtual CPU (VCPU0 210-0 to VCPUm 210-m), virtual memory 230 (VMEM 230), at least one virtual disk 240 (VDISK 240), and one or more virtual device(s) 270 (VDEVICE(S) 270). Note that a disk—virtual or physical—is also a "device," but is usually considered separately because of the important role of the disk. All of the virtual hardware components of the VM 200 may be implemented in software using known techniques to emulate corresponding physical components. Guest system software 202 includes guest operating system (OS) 220 and drivers 224, as needed for the various virtual devices 270.

Figure 1:
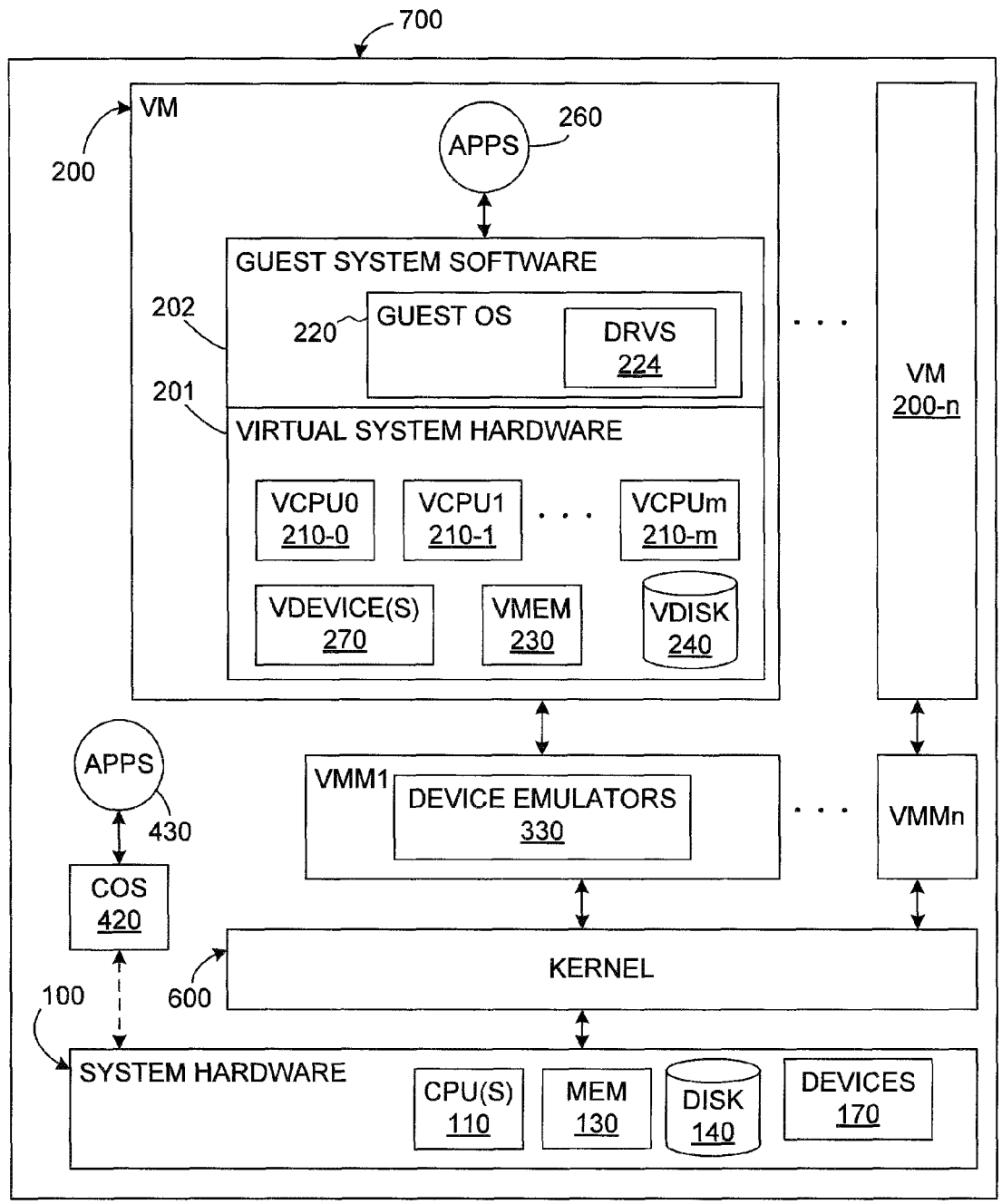
FIG. 1 illustrates a conventional non-hosted virtualized system.

Note that a single VM (for example, VM 200) may be configured with more than one virtualized processor, for example, FIG. 1, illustrates multiple virtual processors VCPU0 210-0, VCPU1 210-1, ..., VCPUm 210-m. Embodiments described herein may be used regardless of the type of multi-threading—physical and/or logical—or the number of processors included in a VM. The design and operation of virtual machines are well known.

Some interface is generally required between guest software within a VM (for example, VM 200) and various hardware components and devices in underlying system hardware platform 100. This interface—which may be referred to generally as "virtualization software"—may include one or more software components and/or layers, possibly including one or more software components known as "virtual machine monitors" (VMMs) (for example, VMM 1, ..., VMM n shown in FIG. 1), "hypervisors," or virtualization "kernels" (for example, kernel 600 shown in FIG. 1). Because virtualization terminology has evolved over time and has not yet become fully standardized, these terms do not always provide clear distinctions between software layers and the components to which they refer. For example, the term "hypervisor" is often used to describe both a VMM and a kernel (for example, VMM 300 and kernel 600 shown in FIG. 1) together, either as separate but cooperating components or with one or more of VMM 1, ..., VMM n incorporated wholly or partially into kernel 600 itself, however, the term "hypervisor" is sometimes used instead to mean some variant of a virtual machine monitor alone, which interfaces with some other software layer(s) or component(s) to support the virtualization. Moreover, in some systems, some virtualization code is included in at least one "superior" VM to facilitate the operations of other VMs. Furthermore, specific software support for virtual machines may be included in the host OS itself. Unless otherwise indicated, the embodiments of the present invention described above may be used in virtualized computer systems having any type or configuration of virtualization software.

FIG. 1 shows VMM 1, ..., VMM n as being separate entities from other components of the virtualization software. Although some software components used to implement one or more embodiments of the present invention are shown and described as being within a "virtualization layer" that is located logically between all virtual machines and the underlying hardware platform and/or system-level host software, this virtualization layer can be considered part of the overall virtualization software (although it would be possible to implement at least part of this layer in specialized hardware). Again, unless otherwise indicated or apparent from the description, it is to be assumed that one or more embodiments of the present invention can be implemented anywhere within the overall structure of the virtualization software, and even in systems that provide specific hardware support for virtualization.

Various virtualized hardware components in VM 200, such as virtual CPU(s) VCPU0 210-0, ..., VCPUm 210-m, virtual memory 230, virtual disk 240, and virtual device(s) 270, are shown as being part of VM 200 for the sake of conceptual simplicity. In actuality, these "components" are usually implemented as software emulations 330 included in VMM 1. In such an arrangement the VMM may (but need not) be set up to expose "generic" devices, which facilitates VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. The term "full virtualization" is sometimes used to denote a system in which no software components are included in the guest other than those that would be found in a non-virtualized computer; thus, guest OS 220 could be an off-the-shelf, commercially available OS with no components included specifically to support use in a virtualized environment. In contrast, the term "para-virtualization" is sometimes used to denote a system wherein the guest is configured to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that guest OS 220 (in particular, its kernel) is specifically designed to support such an interface. According to this view, having, for example, an off-the-shelf version of Microsoft Windows XP as guest OS 220 would not be consistent with the term para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and are not to be limited to any particular term of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of VMM 300. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002). As illustrated in FIG. 1, in many cases, VMMs 1, . . . , n are deployed on top of a software layer—kernel 600—constructed specifically to provide efficient support for VMs 200, . . . , 200-n. This configuration is frequently referred to as being "non-hosted." Kernel 600 may also handle other applications running on it that can be separately scheduled, as well as a console operating system that, in some architectures, is used to boot the system and facilitate certain user interactions with the virtualization software. Note that kernel 600 is not the same as a kernel that will be within guest OS 220—as is well known, every operating system has its own kernel. Note also that kernel 600 is part of the "host" platform of the VM/VMM as defined above even though the configuration shown in FIG. 1 is commonly termed "non-hosted"; moreover, the kernel may be both part of the host and part of the virtualization software or "hypervisor." The difference in terminology is one of perspective and definitions that are still evolving in the art of virtualization.

What is claimed is:

1. A computer program product stored on a computer readable storage medium and configured to perform a computer-implemented method for replaying execution of a virtual machine running on virtualization software based on a log file containing information related to non-deterministic events of another virtual machine, the method comprising:
   executing a sequence of guest instructions, including configuring the virtual machine to operate in binary translation mode;
   tracking an execution point in the sequence of executing guest instructions, the tracking of the execution point comprising determining a current branch count of executed branch instructions;
   switching operation to interpretation mode responsive to the current branch count matching a logged branch count of a logged non-deterministic event stored in the log file;
   comparing the execution point to a recorded execution point of information concerning the logged non-deterministic event stored in the log file, including comparing a current instruction pointer and a current iteration counter to a logged instruction pointer and a logged iteration counter, respectively, of the information concerning the logged non-deterministic event;
   responsive to the current instruction pointer and the current iteration counter matching the logged instruction pointer and the logged iteration counter, respectively, determining that the execution point matches the logged execution point of the information concerning the logged non-deterministic event; and
   responsive to the execution point matching the logged execution point, inserting a subset of the information from the log file into the virtual machine at the execution point.

2. The computer program product of claim 1, wherein the step of inserting comprises:
   stopping execution of the sequence of guest instructions;
   inserting the subset of information indicated by the log file at a matching execution point; and
   continuing execution of the sequence of guest instructions.

3. The computer program product of claim 1, the computer-implemented method further comprising the steps of:
   configuring the virtual machine to operate in direct execution/hardware virtualization mode; and
   responsive to the current branch count matching a target branch count, configuring the virtual machine to roll forward to a matching execution point according to a roll forward process, wherein the target branch count is less than the logged branch count of the logged execution point.

4. The computer program product of claim 3, wherein the roll forward process comprises the steps of:
   configuring the virtual machine to operate in interpretation mode;
   stopping execution of the sequence of guest operating system instructions; and
   inserting the information at the matching execution point.

5. The computer program product of claim 1, wherein the virtual machine operates in one execution mode selected from a plurality of execution modes comprising: an interpretation mode, a binary translation mode, and a direct execution/hardware virtualization mode, the computer-implemented method further comprising the steps of:

following execution of a guest instruction from the sequence of guest operating system instructions, selecting the execution mode from the plurality of execution modes for execution of a next guest instruction; and switching execution to the execution mode selected.

6. A computer program product stored on a computer readable storage medium and configured to perform a computer-implemented method for logging non-deterministic events of a virtual machine running on virtualization software, the method comprising:

configuring the virtual machine to operate in a first execution mode;

executing a sequence of guest instructions according to the first execution mode;

tracking an execution point in the sequence of executing guest instructions, the execution point representing a measure of progress in the sequence of executing guest instructions, including using a software branch counter in tracking the execution point while the virtual machine is operating in the first execution mode;

responsive to detecting the occurrence of a non-deterministic event, recording information related to the non-deterministic event as an entry in a log file together with the execution point associated with the information; and configuring the virtual machine to switch to a second execution mode while continuing to track the execution point, including using a hardware branch counter in tracking the execution point while the virtual machine is operating in the second execution mode.

7. The computer program product of claim 6, wherein the first execution mode is one of an interpretation mode and a binary translation mode, and wherein the second execution mode is a direct execution/hardware virtualization mode.

8. A computer program product stored on a computer readable storage medium and configured to perform a computer-implemented method for replaying execution of a virtual machine running on virtualization software based on a log file storing information concerning logged non-deterministic events of another virtual machine, the method comprising:

configuring the virtual machine to operate in a first execution mode;

executing a sequence of guest operating system instructions according to the first execution mode;

tracking an execution point in the sequence of executing guest instructions, the execution point representing a measure of progress in the sequence of guest instructions, including using a software branch counter in tracking the execution point while the virtual machine is operating in the first execution mode;

comparing the execution point to a logged execution point of information concerning a non-deterministic event stored in the log file;

responsive to the execution point matching the logged execution point, inserting the information into the execution at the execution point; and configuring the virtual machine to switch to a second execution mode while continuing to track the execution point, including using a hardware branch counter in tracking the execution point while the virtual machine is operating in the second execution mode.

9. The computer program product of claim 8, wherein the first execution mode is one of an interpretation mode and a binary translation mode, and wherein the second execution mode is a direct execution/hardware virtualization mode.

10. A computer program product stored on a computer readable storage medium and configured to perform a computer-implemented method for replaying execution of a virtual machine running on virtualization software based on a log file containing information related to non-deterministic events of another virtual machine, the method comprising:

executing a sequence of guest instructions, including configuring the virtual machine to operate in direct execution/hardware virtualization mode;

tracking an execution point in the sequence of executing guest instructions, the tracking of the execution point comprising determining a current branch count of executed branch instructions;

responsive to the current branch count matching a target branch count, configuring the virtual machine to roll forward to a matching execution point according to a roll forward process, wherein the target branch count is less than a logged branch count of a logged execution point of information concerning a non-deterministic event stored in the log file, the roll forward process comprising:

(a) configuring the virtual machine to operate in interpretation mode; and (b) stopping execution of the sequence of guest operating system instructions;

comparing the execution point to the logged execution point of the information concerning the non-deterministic event stored in the log file; and responsive to the execution point matching the logged execution point, inserting a subset of the information from the log file into the virtual machine at the logged execution point.

* * * * *